United States Patent [19]
Scholtz et al.

[11] Patent Number: 5,991,336
[45] Date of Patent: Nov. 23, 1999

[54] SYSTEM AND METHOD FOR OPTIMIZING HIGH SPEED DATA TRANSMISSION

[75] Inventors: William H. Scholtz, Middletown; Richard Gut, Red Bank, both of N.J.

[73] Assignee: Globespan Technologies, Inc., Red Bank, N.J.

[21] Appl. No.: 08/953,082

[22] Filed: Oct. 17, 1997

Related U.S. Application Data

[60] Provisional application No. 60/053,767, Jul. 25, 1997.

[51] Int. Cl.$^6$ .................................. H04B 1/38; H04L 5/16
[52] U.S. Cl. ............................ 375/222; 375/219; 332/103
[58] Field of Search ...................... 375/222, 219, 375/200, 350, 240, 261, 298; 332/103

[56] References Cited

U.S. PATENT DOCUMENTS

| | | | |
|---|---|---|---|
| 4,808,937 | 2/1989 | Correa et al. | 328/155 |
| 4,849,703 | 7/1989 | Easley et al. | 328/63 |
| 4,868,864 | 9/1989 | Tjahjadi et al. | 379/98 |
| 5,040,194 | 8/1991 | Tjahjadi et al. | 375/98 |
| 5,249,200 | 9/1993 | Chen et al. | 375/58 |
| 5,263,051 | 11/1993 | Eyuboglu | 375/34 |
| 5,519,732 | 5/1996 | Chester | 375/295 |
| 5,548,615 | 8/1996 | Wei | 375/281 |
| 5,666,378 | 9/1997 | Marchetto et al. | 375/222 |
| 5,761,210 | 6/1998 | Claydon et al. | 371/2.1 |
| 5,784,417 | 7/1998 | Alamouti | 375/341 |
| 5,793,759 | 8/1998 | Rakib et al. | 370/342 |
| 5,838,727 | 11/1998 | Lyon et al. | 375/261 |

OTHER PUBLICATIONS

Performance and Spectral Compatibility of OPTIS HDSL2, Jun. 30, 1997, 7 pages.

*Primary Examiner*—Stephen Chin
*Assistant Examiner*—Mohammad Ghayour
*Attorney, Agent, or Firm*—Thomas, Kayden, Horstemeyer & Risley

[57] ABSTRACT

The present invention is drawn to a system and method for transmitting a data signal using digital subscriber loops in an expanded frequency band. According to the present invention, an encoder receives a data signal to be transmitted to a second modem. The encoder generates both an in-phase and a quadrature signal based on the data signal. Both the in-phase signal and the quadrature signals are then processed by a signal precoder in preparation for transmission across the channel. Next, the in-phase and quadrature signals are processed by digital filters to produce signals of limited bandwidth which can be transmitted across the channel. The coefficients of the digital filter are chosen such that the resulting filtered in-phase and quadrature signals are transmitted in an expanded bandwidth. The quadrature signal is filtered so as to be orthogonal to the in-phase signal. Thereafter the filtered signals are added and then converted to an analog signal which is transmitted to the second modem. The second modem features signal recovery circuitry which will process the expanded bandwidth resulting in a baseband which features an increased signal to noise ratio making the data transmission less susceptible to interference.

22 Claims, 11 Drawing Sheets

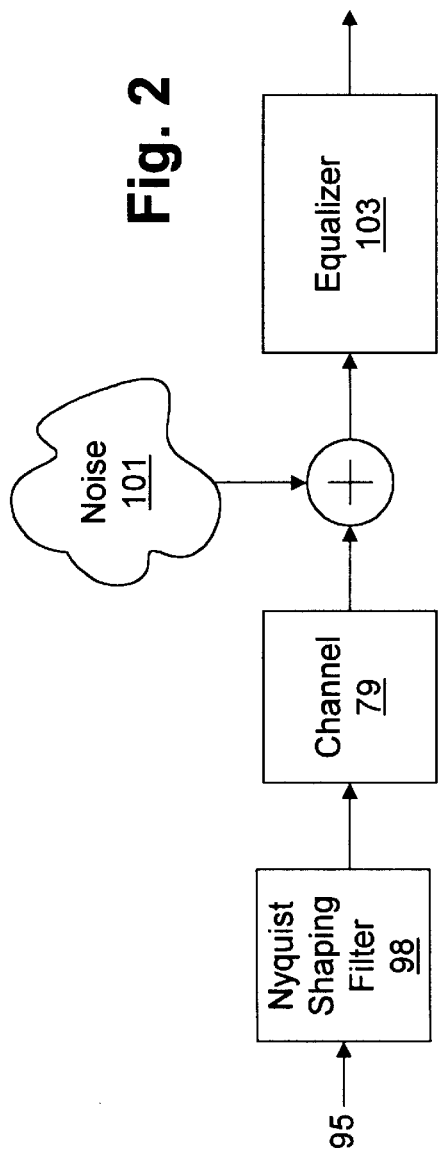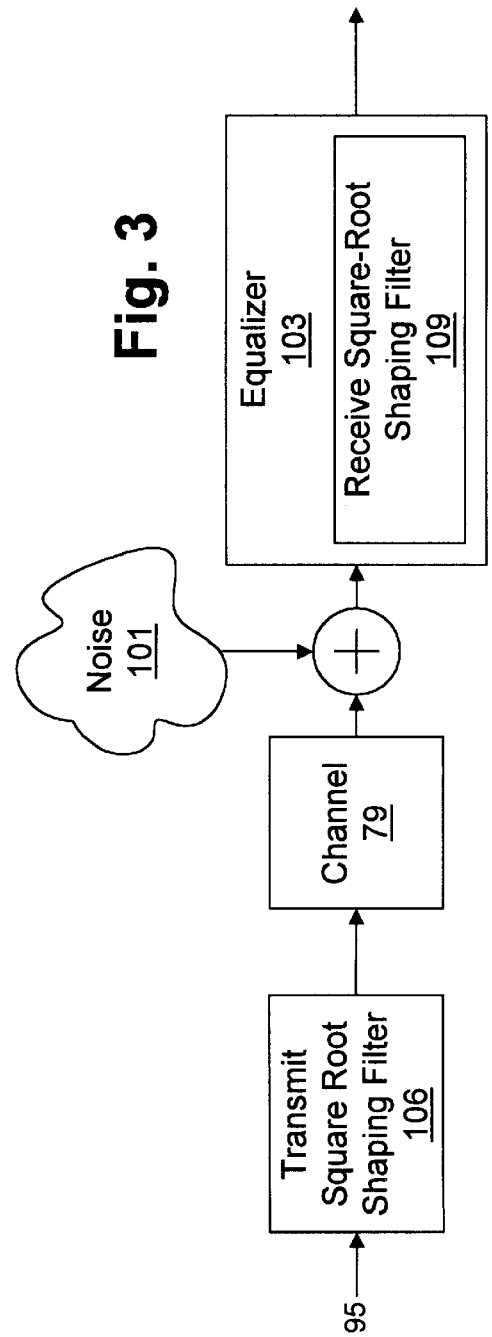

SYSTEM AND METHOD FOR OPTIMIZING HIGH SPEED DATA TRANSMISSION

CROSS REFERENCE TO RELATED APPLICATIONS

This application claims the benefit of co-pending United States provisional patent application entitled "Communication System with Expanded Bandwidth and Improved Timing Recovery" filed on Jul. 25, 1997 and afforded Ser. No. 60/053,767.

FIELD OF THE INVENTION

The present invention relates to the field of data communication, and more particularly, to data communication via a digital subscriber line.

BACKGROUND OF THE INVENTION

The speed of data communication is being pushed to ever increasing rates. The advent of Digital Subscriber Lines (DSL) now makes data communication in the megabit-per-second range possible across existing copper wire links between subscriber modems and central office modems in the public switched telephone network (PSTN).

As known to those skilled in the art, a central office provides individual subscribers with access to the PSTN. In most cases, the subscriber is linked to the central office via a twisted pair of copper wires. The central office provides an interface between the subscriber to the PSTN.

In order to facilitate DSL communication, a DSL modem is included in the link at the central office to communicate with a DSL modem used on the subscriber end of the two wire pair. DSL provides high-speed multimedia services which can operate up to approximately 400 times faster that traditional analog telephone modems.

DSL comes in several different configurations. One is the Asymmetric Digital Subscriber Line (ADSL) which provides data rates of 32 kbps to 8.192 Mbps while simultaneously providing telephone phone service. Also, Rate Adaptive Asymmetric Digital Subscriber Line (RADSL) is much like ADSL, only it allows bandwidth adjustment to fit the particular application and to accommodate the length and quality of the line. In particular, the data rate of a RADSL may be adjusted downward to accommodate a longer distance to the central office. Other configurations include High-bit-rate Digital Subscriber Line (HDSL), Symmetric Digital Subscriber Line (SDSL), and Very high-bit-rate Digital Subscriber Line (VDSL).

While DSL provides much higher rates of data communication, it is not without problems. In particular, at the higher frequencies used in DSL communication, the traditional two wire interface may not provide a reliable pathway or channel through which the data signal can travel. Often times, an interfering signal may be induced onto the two wire channel from a second two wire in close proximity. Such a signal might be from a second DSL modem that is communicating to the same central office.

Another problem may be the quality of the two wire channel itself. High frequency traffic generally experiences greater attenuation in the two wire channels. Also, interconnections that occur in the channel may degrade or loosen over a period of time, causing noise and further signal degradation.

As a result, data communication using DSL is becoming more susceptible to interference that causes disruption of the data signal. As more and more digital subscriber lines are installed, the probability of interference among two wire channels increases. Also, as the existing copper two wire network gets older, the quality of the channels will further degrade. Additionally, as DSL gains in popularity, it is likely that subscribers who are located greater distances away from central offices will desire DSL service, even though the longer distance results in greater signal attenuation.

Consequently, there is a need for a DSL transmitter which overcomes the problems of data signal interference and attenuation currently experienced.

SUMMARY OF THE INVENTION

The present invention is drawn to a system and method for transmitting a data signal using digital subscriber loops in an expanded frequency band. According to the present invention, an encoder receives a data signal to be transmitted to a second modem. The encoder generates both an in-phase and a quadrature signal based on the data signal. Both the in-phase signal and the quadrature signals are then processed by a signal precoder in preparation for transmission across the channel. Next, the in-phase and quadrature signals are processed by digital filters to produce signals of limited bandwidth which can be transmitted across the channel. The coefficients of the digital filters are chosen such that the resulting filtered in-phase and quadrature signals are transmitted in an expanded bandwidth. The quadrature signal is filtered so as to be orthogonal to the in-phase signal. Thereafter the filtered signals are added and then converted to an analog signal which is transmitted to the second modem.

The second modem features signal recovery which will process the expanded bandwidth resulting in a baseband which features an increased signal to noise ratio making the data transmission less susceptible to interference.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2 is a block diagram illustrating a communication channel with a Nyquist filter;

FIG. 3 is a second block illustrating a communication channel with a Nyquist filter;

DETAILED DESCRIPTION OF THE PREFERRED EMBODIMENT

Figure 1:
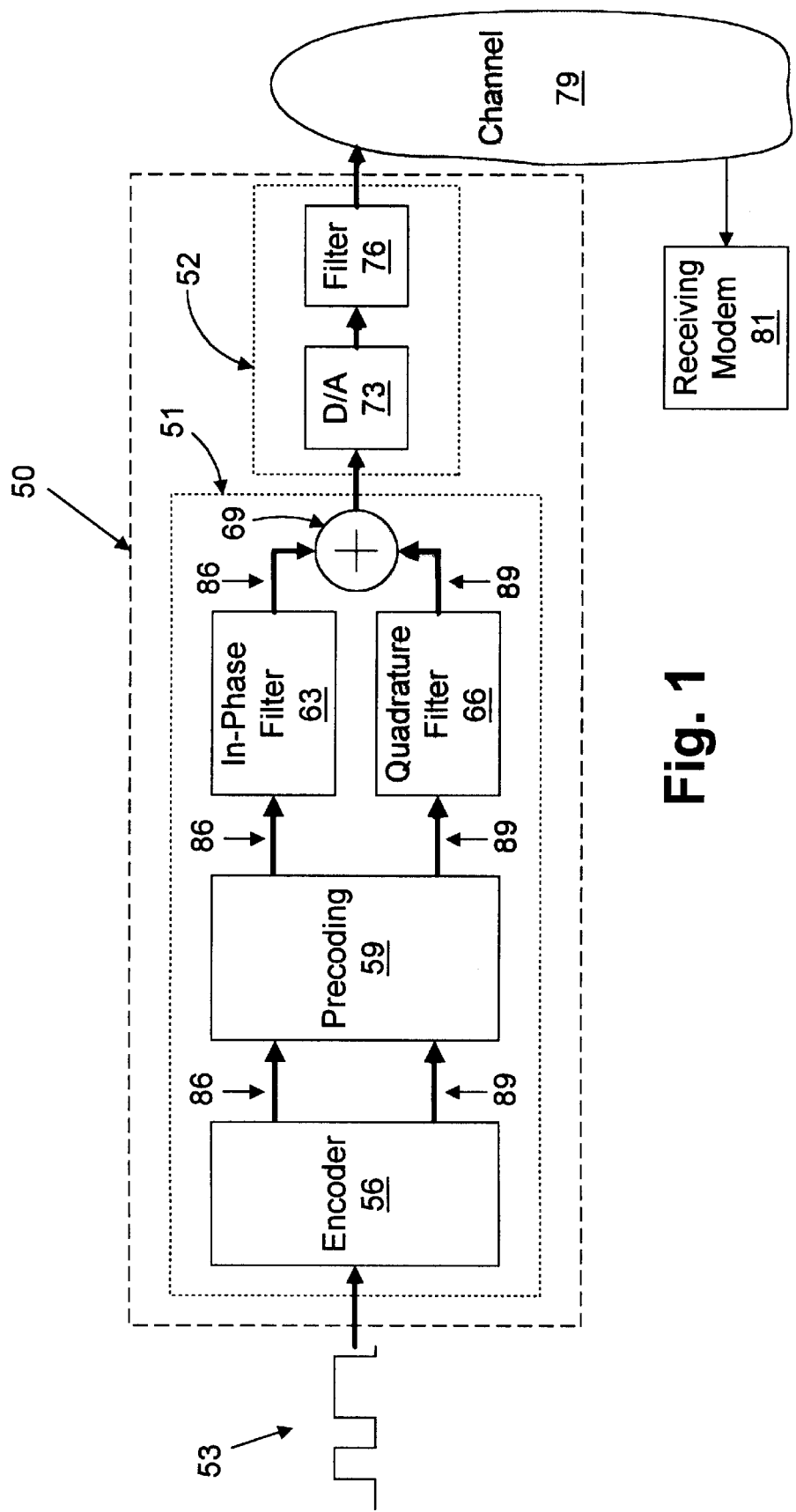
FIG. 1 is a block diagram of the operational components of a modem according to the preferred embodiment.

Turning to FIG. 1, shown are the major physical and functional data transmission components of a modem 50 constructed according to the preferred embodiment. The primary physical components include an application specific integrated circuit (ASIC) 51 and a separate integrated circuit 52. The ASIC 51 contains several digital signal processors which operate according to specific programs as well as dedicated circuits as known to those skilled in the art. The data input 53 is that which is generated by a computer or other electronic device to be communicated. The data input 53 is routed to a dedicated circuit on the ASIC 51 which performs as an encoder 56. The encoder 56 is electrically coupled to digital signal processors resident on the ASIC 51 which are programmed with logic to perform as the precoder 59, in-phase filter 63, quadrature filter 66, and the adder 69. The ASIC 51 is electrically coupled to a digital to analog converter 73 and an output filter 76, both of which are resident on the separate integrated circuit 52. The output of the adder 69 is chanelled to the digital to analog converter 73 through this electrical coupling. The output from the filter 76 is transmitted through the channel 79 which represents the communication pathway for the data communication to the receiving modem 81.

To describe the general operation of the preferred embodiment, the encoder 56 receives a data signal 53 from a computer or other device as known by those skilled in the art. The encoder 56 then generates a discrete in-phase signal 86 and a discrete quadrature signal 89. This is known as Carrierless Amplitude Modulation/Phase Modulation (CAP) to those skilled in the art.

The discrete values of both the in-phase and quadrature signals 86 and 89 are generated using modulation techniques in which several points on a modem constellation correspond to specific sequences of bits of the incoming data signal as known to those skilled in the art. The number of different discrete values which may be employed by the in-phase and quadrature signals 86 and 89 depends on the particular constellation employed. In the preferred embodiment, several different constellations may be used ranging from 8 to 256 points in powers of 2. The operation of the encoder 56 will not be discussed in detail as it is an expedient well within the understanding of those skilled in the art.

The precoder 59 processes the in-phase and quadrature signals 86 and 89 so as to pre-distort the transmitted signal in accordance with channel characteristics learned during channel training. Generally, the receiver is trained when data communication is established and the receiving modem 81 will send precoder filter coefficients to the transmitting modem 50. The function of the precoder 59 according to the instant invention is an expedient understood by those skilled in the art and is not discussed in detail here.

Once conditioned by the precoder 59, the in-phase signal 86 is processed by the in-phase transmission filter 63 and the quadrature signal 89 is processed by the quadrature transmission filter 66. In the preferred embodiment, the in-phase and quadrature filters 63 and 66 are finite-impulse-response (FIR) digital filters. The in-phase filter 63 and the quadrature filter 66 are also known as "shaping" filters. This is because one purpose of the filters 63 and 66 is to alter the shape of the discrete in-phase and quadrature signals 86 and 89 to a form which may be transmitted within a limited bandwidth of frequencies at a predetermined center frequency. In other words, the in-phase and quadrature filters 63 and 66 place the resulting signals in the desired frequency band.

Turning to FIG. 2, shown is a block diagram that shows the filtering functions in relation to the channel. The data signal 95 is processed by the Nyquist shaping transmit filter 98 before being transmitted across the channel 79. The Nyquist shaping transmit filter 98 represents the functions performed by both the in-phase filter 63 (FIG. 1) and the quadrature filter 66 (FIG. 1). During transmission through the channel 79, noise 101 is introduced into the data signal 95. The equalizer 103 serves to recover the signal transmitted through the channel by minimizing signal distortion that may occur due to the impulse response of the channel 79. Also, the equalizer 103 will minimize noise 101 introduced in the channel 79 by preventing noise from folding back into the transmitted signal. FIG. 2 is an example of a transmission filter which is localized on the transmitter side of the channel 79.

Referring to FIG. 3, shown is an example of a distributed shaping filter according to the preferred embodiment of the instant invention. Rather than localize the function of the shaping filter on the transmit side of the channel as in FIG. 2, the configuration of FIG. 3 features both a transmit square root shaping filter 106 and a receive square-root shaping filter 109 within equalizer 103. Whereas the function of the Nyquist shaping filter 98 (FIG. 2) might be expressed as $G(f)$, the function of both the transmit square-root filters 106 and 109 can be written as $\sqrt{G(f)}$. With regard to the Nyquist shaping, the square-root filter 106 and 109 are essentially the same. In the configuration of FIG. 3, the cascade of the two square-root shaping filters 106 and 109 provides the desired Nyquist shaping filter as the total impulse response of cascaded filters as such is found by multiplying them together where $\sqrt{G(f)} \times \sqrt{G(f)} = G(f)$. Note in the preferred embodiment, the square-root shaping filter 109 is incorporated within the logic executed by the equalizer 103 and is not a separate filter. Generally, incorporation of a such filter within the logic of an equalizer is and expedient known to those skilled in the art.

Figure 4:
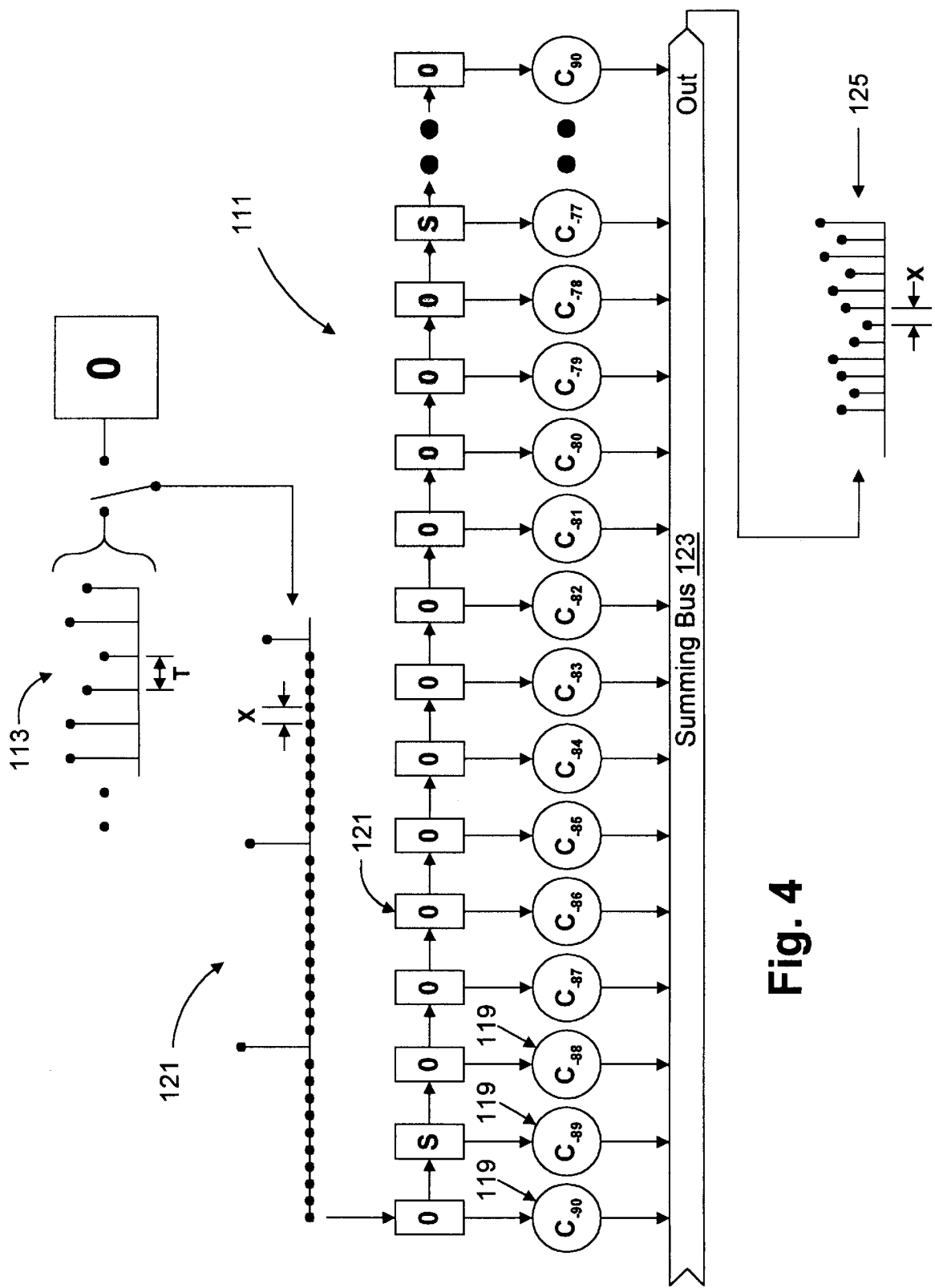
FIG. 4 is a drawing illustrating the operation of the in-phase filter and the quadrature filter depicted in FIG. 1.

Referring to FIG. 4, shown is a diagram that illustrates a digital filter 111 of the type used for either the in-phase filter 63 (FIG. 1) or the quadrature filter 66 (FIG. 1). The symbols 113 are the discrete values of the in-phase signal 86 (FIG. 1) or the quadrature signal 89 (FIG. 1) before they are input into the in-phase filter 63 or the quadrature filter 66. The symbols are separated in time by the symbol period T. As the symbols 113 are read into the filter 111, they are subjected to an upsampling process. Essentially, the upsampling process involves the injection of zero samples between the symbols to achieve a higher sample rate. In the frequency domain, the upsampling process results in the repetition of the baseband signal every 1/T. The upsampling process described herein is an expedient well known to those skilled in the art and is not discussed in detail.

After the upsampling process, the resulting signal is comprised of samples 121 separated by a sample period X. To clarify, the symbol period T relates to the time between the original symbols 113. The sample period X relates to the time between the samples 121 after the upsampling process. In a sense, the symbols 113 are converted to samples 121 after the upsampling process. In FIG. 4, the samples 121 are then fed into the digital filter 111. The digital filter 111 is a finite impulse response filter of the type $$y(t) = C_0 x(t) + C_1 x(t-1) + C_2 x(t-2) + \ldots + C_n x(t-n).$$

The coefficients $C_n$ 119 are multiplied by the samples 121 and summed together at the summing bus 123. The samples 121 are separated in time by the sample period X. After each summing operation is performed, the samples 121 are shifted and a new sample 121 is injected into the digital filter 111. The output of the summing operation is the discrete signal 125. This particular digital filter is described here as an example to provide background. In the preferred embodiment, the digital filter is configured so that only coefficients are multiplied by an actual sample and summed at the summing bus 123. This speeds up the processing time. Such configurations are well known to those skilled in the art and will not be described herein.

According to the preferred embodiment, the FIR filter coefficients 119 are found using the square root shaping filter G(f) mentioned previously. To determine the coefficients 119 for the in-phase filter 63, the impulse response of a square-root Nyquist baseband filter is first defined. Generally, such a response should comply with Nyquist criteria which are known to those skilled in the art. In the preferred embodiment, the impulse response g(t) chosen for the Nyquist filtering is a square root raised-cosine which is placed in both the transmitter and receiver as in FIG. 3, where a raised cosine function h(t) is given as $$h(t) = \left( \frac{\sin(\pi t / T)}{\pi t / T} \right) \left( \frac{\cos(\alpha \pi t / T)}{1 - (2\alpha t / T)^2} \right).$$

The square-root raised-cosine pulse g(t) is then expressed as $$g(t) = \frac{\sin[\pi(1-\alpha)t'] + 4\alpha t' \cos[\pi(1+\alpha)t']}{\pi t'[1 - (4\alpha t')^2]}$$

where t'=t/T and $\alpha$ is defined as the excess bandwidth.

Note that although the impulse response of a square-root raised cosine is not the only which will suffice in this instance. Other impulse responses which may be used include the raised cosine itself and others known by those skilled in the art.

Next, a center frequency, $f_c$ for the spectrum of the CAP signal is determined. This is to be equal to or larger than the largest frequency for which the Fourier transform G(f) of g(t) is nonzero.

The impulse response of the in-phase filter 63 is defined as $f(t)$. The impulse response of the quadrature filter 66 is the Hilbert transform, $\hat{f}(t)$, of the impulse response of the in-phase filter 63. The Hilbert transform $\hat{f}(t)$ provides an impulse response that is orthogonal to the original impulse response $f(t)$. This is necessary to allow the addition of the output of the in-phase filter 63 and the quadrature filter 66 so that the data from each filter may be extracted at the receiver. In the preferred embodiment, the impulse response $f(t)$ and its Hilbert transform $\hat{f}(t)$ are defined as $f(t) = g(t) \cos 2\pi f_c t$ and $\hat{f}(t) = g(t) \sin 2\pi f_c t$. Note the multiplication of the function g(t) by a cosine function in $f(t)$ and a sine function in $\hat{f}(t)$ will modulate the signal to the carrier frequency $f_c$. Thus g(t) can be thought of as the baseband signal.

The coefficients of the in-phase and quadrature filters 63 and 66 (which are finite-impulse-response filters) are determined by plugging in discrete values of time into the formulas for the impulse response function $f(t)$ and its Hilbert transform $\hat{f}(t)$. Assuming $c_i$ and $d_i$ are the values of the $i^{th}$ tap coefficient 119 of the in-phase and quadrature filters 63 and 66, respectively, the values of the tap coefficients are then computed by $c_i = g(iT)[\cos(2\pi f_c iT)]$ and $d_i = g(iT)[\sin(2\pi f_c iT)]$. In the preferred embodiment, there are 180 different coefficients used in both the in-phase filter 63 and the quadrature filter 66. It would be possible to use more or less coefficients depending upon the desired frequency response.

According to the preferred embodiment of the instant invention, the coefficients the in-phase filter 63 and the quadrature filter 66 are found by first specifying the excess bandwidth $\alpha$ as well as the center frequency $f_c$ of the equation g(t) of the ultimate band in which transmission of data is to take place.

Next a value is chosen for symbol period T' with which to calculate filter coefficients $c_i$ and $d_i$. The symbol period T' chosen is smaller than the actual symbol period T of the incoming signal. Although prior art systems are designed to minimize the bandwidth of the transmitted signal, the intentional use of T' as the symbol period in equation g(t) will result in an increase in the transmission bandwidth. There are certain advantages to be derived from the increased bandwidth as discussed below.

Figure 5:
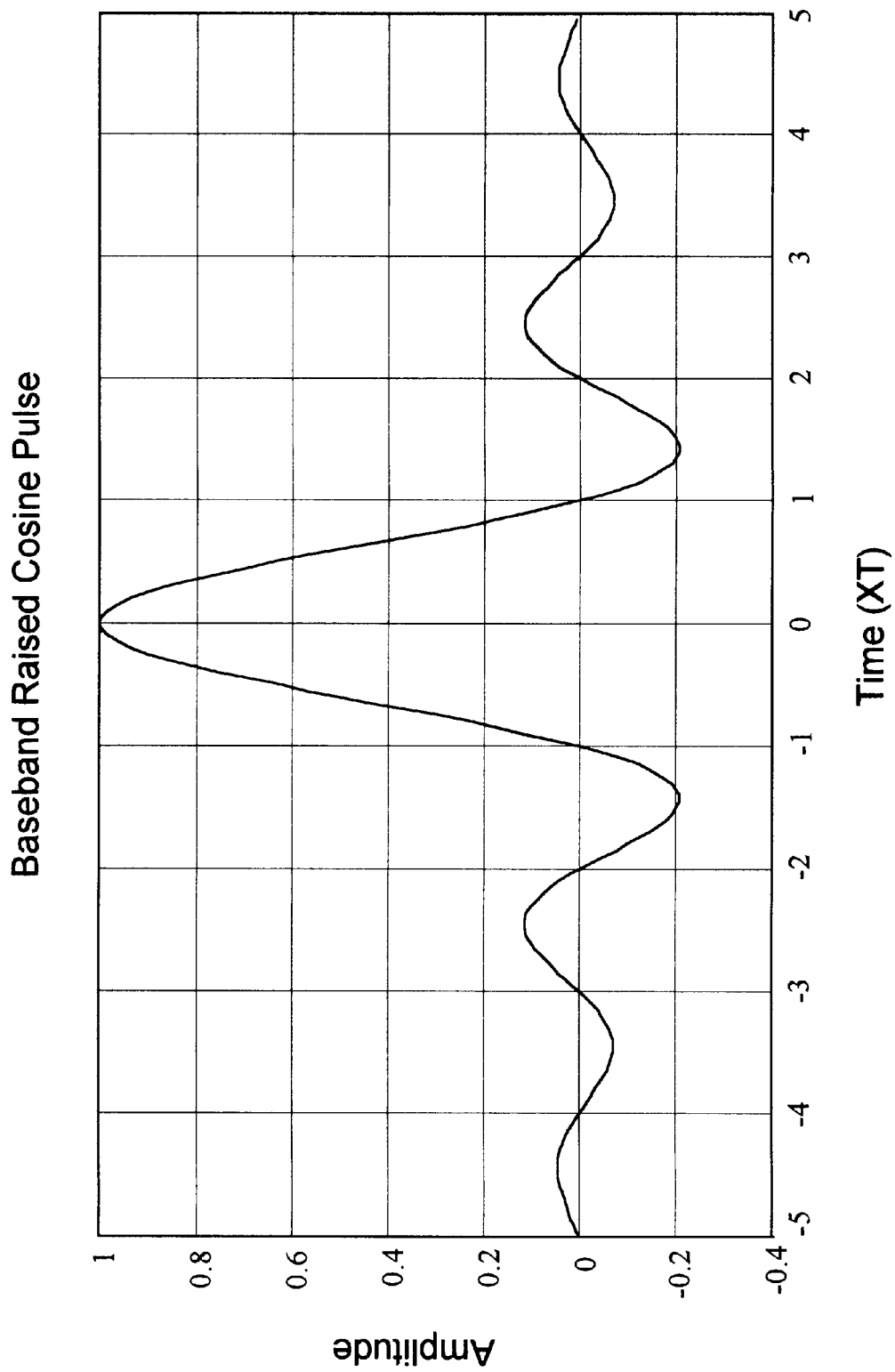
FIG. 5 is a graph of a baseband raised cosine shaping pulse used in calculating the coefficients of the in-phase and quadrature filters without bandwidth expansion.

To explain further, referring to FIG. 5, shown as an example is a graph of the baseband raised cosine impulse response h(t) where the symbol period used in the calculation of h(t) is the actual symbol period T of the in-phase signal 86 (FIG. 4). Note that the curve crosses the zero axis at multiples of the symbol period T. Thus, this curve conforms with the Nyquist criterion. In particular, where samples of the in-phase and quadrature signals 86 and 89 are shaped by this curve, the transmission bandwidth is at a minimum.

Figure 6:
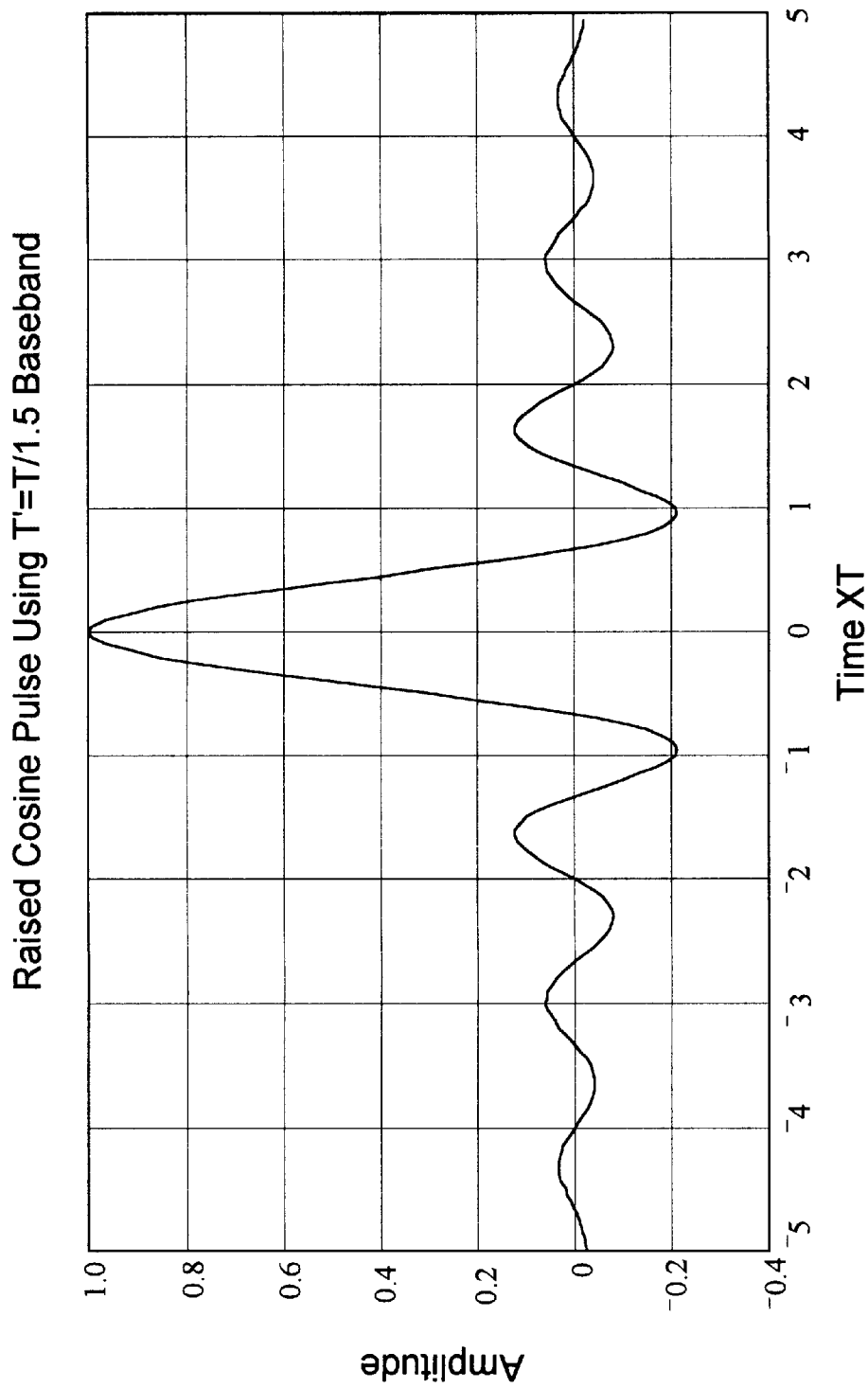
FIG. 6 is a graph of a baseband raised cosine shaping pulse used in calculating the coefficients of the in-phase and quadrature filters with bandwidth expansion according to the preferred embodiment.

Turning now to FIG. 6, we see an example of the baseband impulse response of the in-phase filter 63 according to the preferred embodiment. As before, the impulse response h(t) is defined as a raised cosine. However, a value T' is used in place of the actual symbol period in the calculation of h(t) which is less than the actual symbol period T of the in-phase and quadrature signals 86 and 89. The result is an increase in transmission bandwidth.

Thus, the coefficients $c_i$ of the in-phase filter 63 (FIG. 1) are determined by $c_i = g(iT)[\cos(2\pi f_c iT')]$ which correspond to discrete points along the impulse response curve $f(t)$.

Likewise, the coefficients $d_i$ for the quadrature filter 66 (FIG. 1) are determined by $d_i = g(iT)[\sin(2\pi f_c iT)]$. Each coefficient is known as a "tap". In the preferred embodiment, there are 180 taps for both the in-phase and quadrature filters 63 and 66, although more or less may be used.

Figure 7:
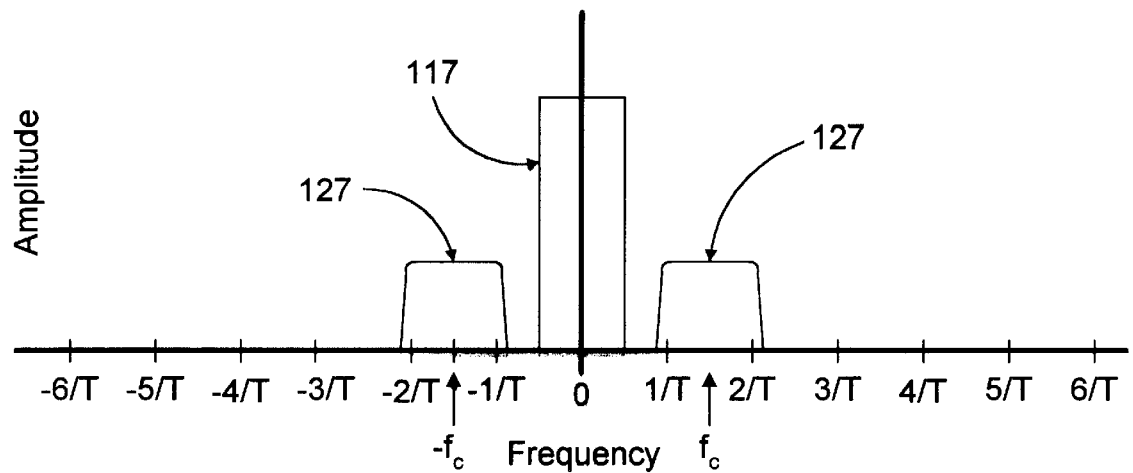
FIG. 7 is a frequency plot illustrating the transmit spectrum without bandwidth expansion.
Figure 8:
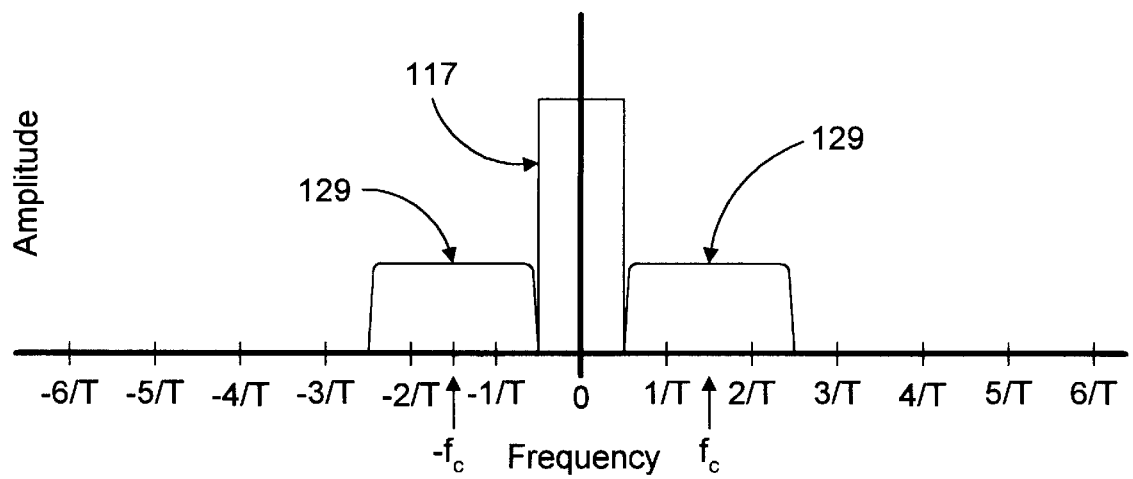
FIG. 8 is a frequency plot showing the transmit spectrum with bandwidth expansion according to the preferred embodiment.

Referring next to FIG. 7, shown in the frequency spectrum is the nominal bandwidth 127 which results from using the actual symbol period T in calculating the impulse response $f(t)$. FIG. 8 illustrates the expanded bandwidth 129 that results from using the value T' in calculating the impulse response $f(t)$. In effect, the use of T' in place of the actual symbol period T in calculating the coefficients of the in-phase and quadrature filters 63 and 66 (FIG. 1) expands the bandwidth of the filtered signal in the frequency spectrum centered at the center frequency $f_c$ chosen. Thus in the preferred embodiment, the expanded bandwidth 129 of transmission is obtained by processing the baseband signal by a filter with coefficients which were calculated using a symbol period T' which is less than the actual symbol period T (FIG. 4) of the unfiltered signal, as opposed to the bandwidth of a signal processed by a filter with coefficients which were calculated using the symbol period T (FIG. 4) of the unfiltered signal. The expanded bandwidth is made of a signal with significant inter-symbol interference.

According to the preferred embodiment, the actual value chosen for T' is approximately 0.9T. However, it is understood that T' may be anything less than T limited only by the amount of bandwidth expansion one wishes to achieve being cognizant of the fact that a more expansive bandwidth requires greater energy to transmit. Also, the capabilities of the receiving modem 81 may limit the allowable bandwidth expansion.

Figure 9A:
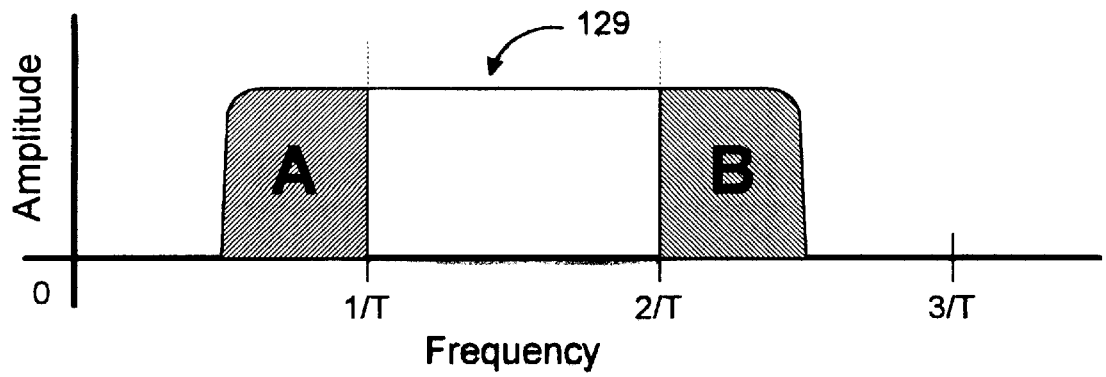
FIG. 9A is a frequency plot illustrating an expanded bandwidth according to the preferred embodiment showing the added bandwidth.
Figure 9B:
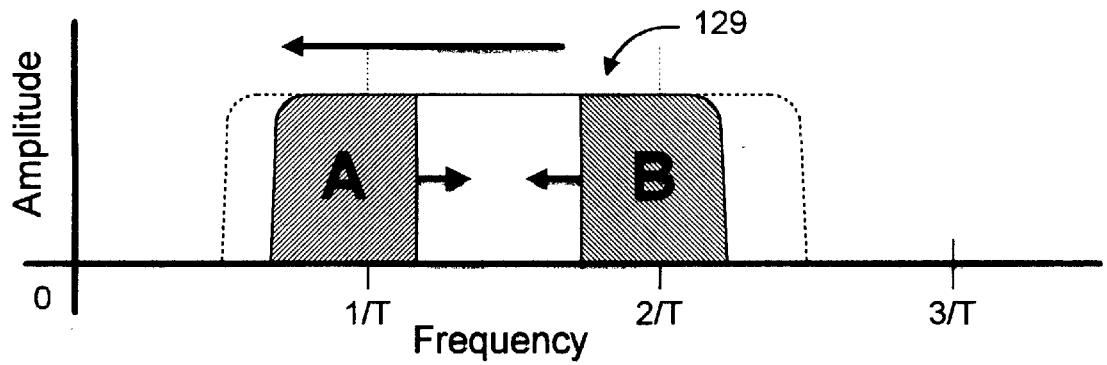
FIG. 9B is a frequency plot showing the effect on the expanded bandwidth of FIG. 9A after processed by a receiver.
Figure 9C:
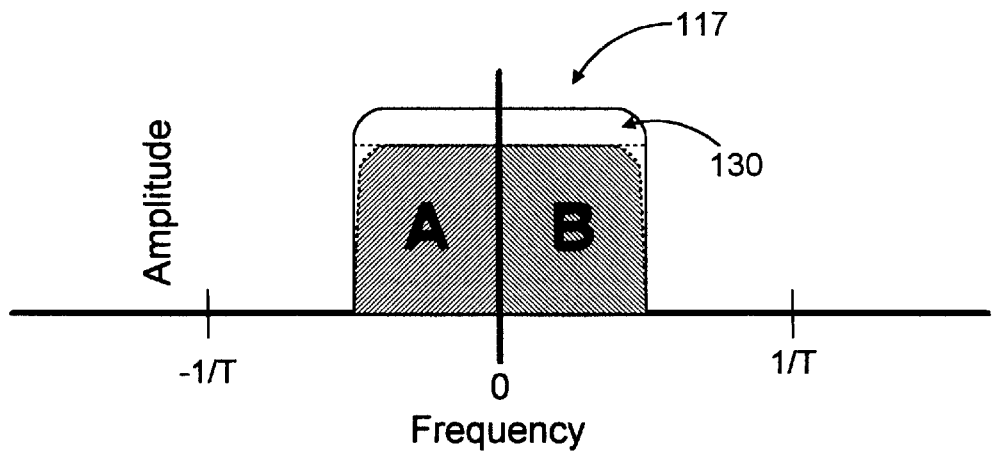
FIG. 9C is a frequency plot showing the transmit spectrum as received by the receiver with the resulting increase in signal strength.

Turning to FIGS. 9A through 9C, shown is an example of the expanded bandwidth 129 as it is processed by the receiving modem 81 (FIG. 1) with dynamic equalization. In FIG. 9A, the center section of the expanded bandwidth 129 is 1/T wide as would be the case without the expansion of the bandwidth according to the preferred embodiment. The cross-hatched sections A and B represent the extent to which the bandwidth has been expanded according to the preferred embodiment. Upon receiving the signal with the expanded bandwidth 129, the dynamic equalization in the receiving modem 81 will sample at several times the original symbol rate. However, the dynamic equalization will ultimately produce one sample per symbol.

Turning to FIG. 9B, shown is the effect on the bandwidth as seen by the receiving modem 81. In the receiving modem 81, the transmitted signal received is subjected to a down-sampling process in which aliasing causes the expanded ends A and B of the expanded bandwidth to shift up or down by 1/T. In a sense, expanded end A is shifted up in frequency by 1/T, and expanded end B is shifted down 1/T. Also, the entire expanded bandwidth is shifted down and ultimately is centered at the DC axis as in FIG. 9C. The end result is shown in FIG. 9C in which the expanded ends A and B rest within the center section of the expanded bandwidth 129 which in turn is centered at the DC axis of the frequency spectrum. Thus the ultimate result of the processing in the receiving modem 81 is that the baseband signal 117 is recovered along with the expanded ends A and B. In shifting, the expanded ends to their new positions, the end result is that the expanded ends A and B are added to the center section coherently. Ultimately, the amplitudes of the frequencies of the center section experience an increase 130 by 6 dB. as shown in FIG. 9C. Any noise accompanying the expanded ends is not added coherently as it is random in nature. Consequently, the overall signal to noise ratio of the originally transmitted signal 53 (FIG. 1) is increased accordingly. Where the bandwidth is expanded by one times the symbol rate 1/T, there will be a 6 dB. gain in the signal. For example, if one where to expand the bandwidth by 2.5 times, then half the baseband signal would experience a 12 dB. gain, and the remaining half would experience a 6 dB. gain.

The increase in the signal to noise ratio for the original signal provides an improvement which serves to reduce the problem of interference and signal degradation during transmission using the two wire pairs.

Thus, the present invention is compatible with existing prior art receiving modems 81 which employ dynamic equalization. The receiving modem 81 will downsample the transmitted signal at a predetermined rate and, ultimately produces a single sample per symbol. However, the predetermined sampling rate of the receiver is chosen to prevent the expanded bandwidth 129 from folding over onto itself.

Turning back to FIG. 8, to explain further, suppose that the receiving modem 81 samples the transmitted signal at the expanded bandwidth 129 at 6/T baud/sec. In such a case, the frequency band from 3/T to 6/T will "fold over" onto the band from 0 to 3/T due to aliasing as known to those skilled in the art. In the case of the expanded bandwidth 129, a sampling rate of 6/T at the receiving modem 81 is permissible as the expanded bandwidth 129 is not effected. On the other hand, suppose the receiving modem 81 samples the transmitted signal at 4/T baud/sec. In such a case, the frequency band from 2/T to 4/T will fold over onto the band from 0 to 2/T. In this situation, part of the expanded bandwidth 129 will fold over onto itself. This is impermissible. This means that both the center frequency $f_c$ and the amount of bandwidth expansion should be specified so that the expanded bandwidth is not placed at a position which is a multiple of one half of the sampling frequency of the receiving modem 81. This means that, in the case where the transmitted signal is sampled at 6/T baud/sec, the expanded bandwidth may be placed anywhere between 0 to 3/T, 3/T to 6/T, 6/T to 9/T, 9/T to 12/T and on.

Figure 10:
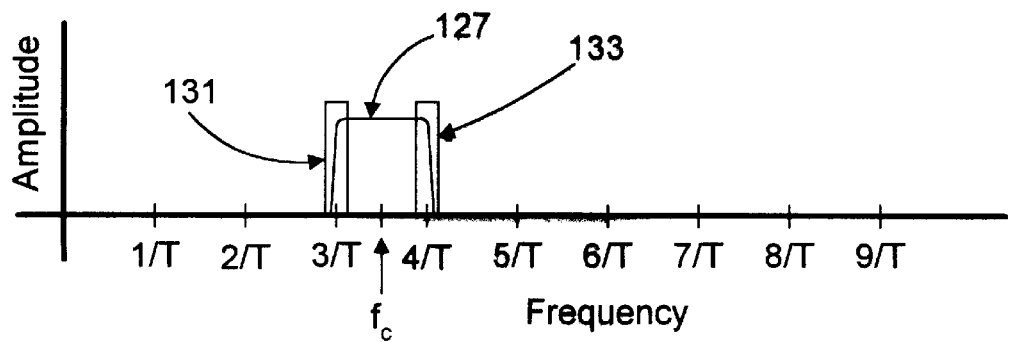
FIG. 10 is a frequency plot of the transmit spectrum of the baseband signal without bandwidth expansion similar to FIG. 7 along with band filters used for timing recovery.

The instant invention also provides significant advantages with regard to timing recovery when using bandedge timing recovery techniques. Turning to FIG. 10, shown is the nominal bandwidth 127 of the transmitted data signal. Bandedge timing recovery involves filtering the received data signal with a pair of band pass filters 131 and 133 that pass the bandedges of the nominal bandwidth 127.

Figure 11:
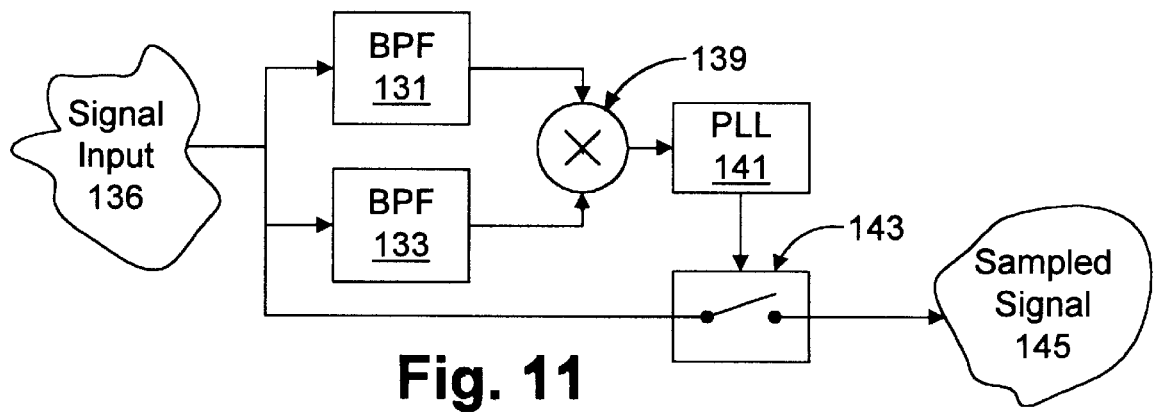
FIG. 11 is a block diagram of the operational components of a timing recovery system according to the preferred embodiment.

Turning to FIG. 11, shown is a basic block diagram of the timing recovery according to the preferred embodiment. Note that the timing recovery of the preferred embodiment as discussed herein is performed by a programmed digital signal processor which may or may not be part of an ASIC. The programming of digital signal processors resident on an ASIC is an expedient understood by those skilled in the art. The signal input 136 is routed to the band pass filters 131 and 133. The resulting signals are then multiplied by the multiplier 139. The result of the signal multiplication is a sine wave or tone with a frequency of twice the center frequency of the received signal input 136. This tone is sent to a phase locked loop 141 to eliminate fluctuations. From the phase locked loop 141, a square wave is produced which controls the trigger mechanism 143, which causes the signal input 136 to be sampled at the proper time. The sampled signal 145 is then further processed and the original data extracted as known to those skilled in the art.

Figure 12:
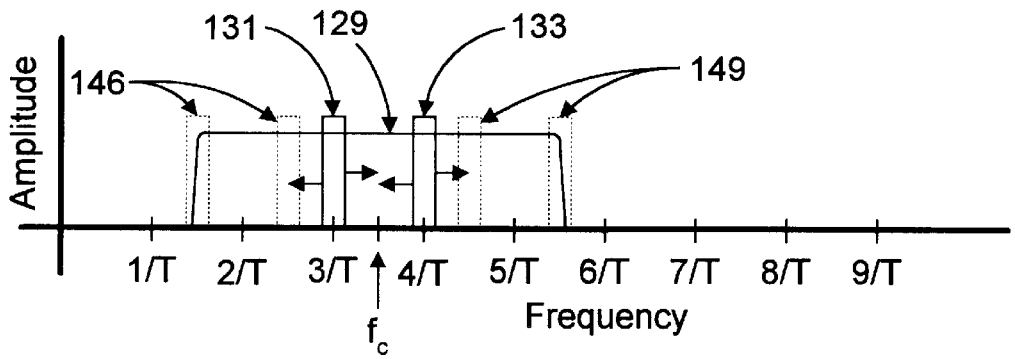
FIG. 12 is a frequency plot of the transmit spectrum of the expanded bandwidth showing the band filters used for timing recovery according to the preferred embodiment.

Turning to FIG. 12, shown is the expanded bandwidth 129 with the band pass filters 131 and 133. Note that the expanded bandwidth 129 of has been expanded by a factor of four over the baseband bandwidth 127 (FIG. 10) of 1/T.

According to the preferred embodiment, the band pass filters 131 and 133 may be placed as a pair anywhere along the expanded bandwidth 129 in order to recover the bandage information from which the tone or sine wave is produced. The only requirement is that the bandpass filters 131 and 133 be separated by the nominal bandwidth 127 (FIG. 10) which is 1/T. Thus timing recovery may occur at any point along the expanded bandwidth 129. Thus, the band pass filters 131 and 133 may be tuned along the expanded bandwidth until the strongest tone signal with the least amount of channel interference is detected. In the preferred embodiment, timing recovery is first attempted by tuning the band pass filters 131 and 133 at the bottom position 146 of the expanded bandwidth 129. If timing recovery does not occur due to interference, then the band pass filters 131 and 133 are tuned at the top position 149 of the expanded bandwidth 129. Note, however, that the present invention is advantageous in that it provides for a transmit spectrum with band edges with less roll-off, thereby allowing greater bandwidth expansion within a fixed transmission bandwidth. Also, timing recovery is greatly improved because it can occur within the expanded bandwidth where the signal strength is strong rather than in the roll-off regions.

Figure 13:
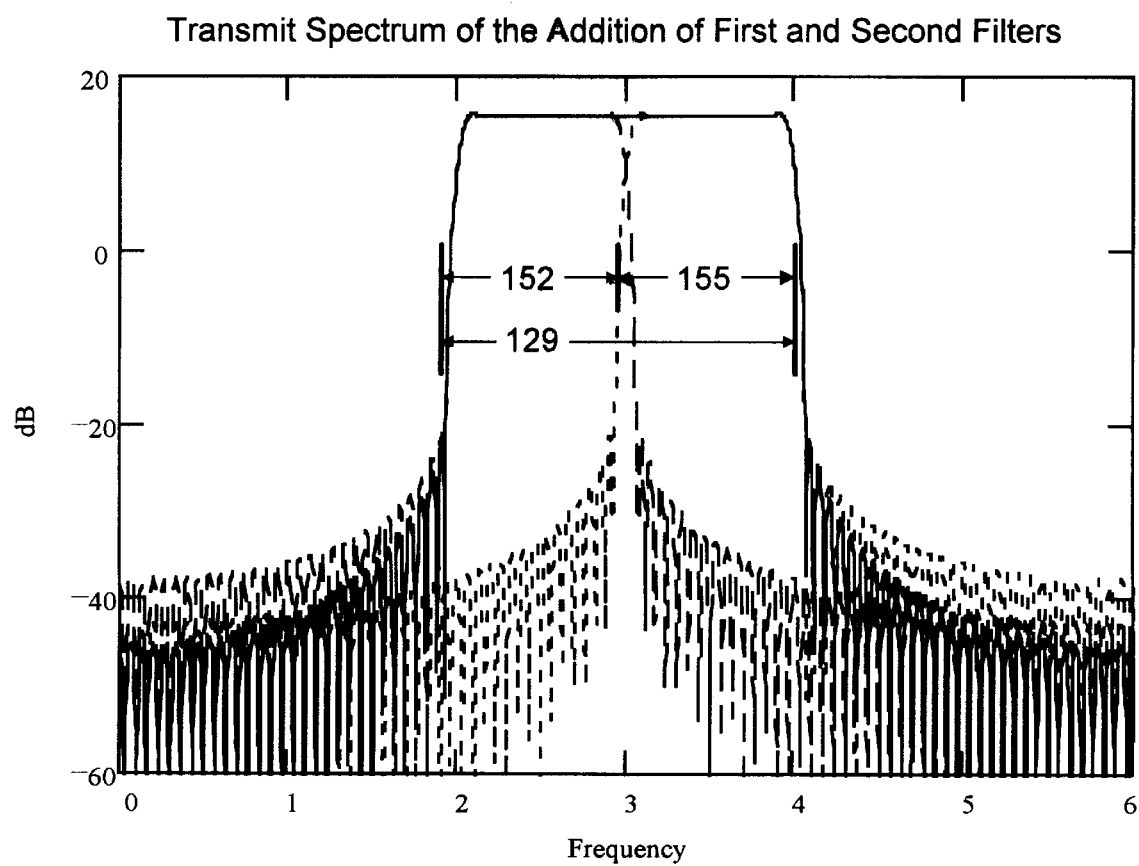
FIG. 13 is a frequency plot of the transmit spectrum of the second embodiment of the present invention.

Turning to FIG. 13, shown is a second embodiment of the present invention. In the second embodiment, the bandwidth expansion may be accomplished by creating a first filter 152 and a second filter 155, each with a nominal bandwidth 127 (FIG. 9). The coefficients of the two filters are calculated so as to have center frequencies $f_c$ exactly one symbol rate 1/T apart. The coefficients are then added together into a single filter with an expanded bandwidth 129. With the second embodiment, a flat inband response is achieved by using a raised cosine for the transmit filters 152 and 155 rather than a square-root raised cosine. In fact, one may use any other transmit filter that meets the Nyquist criterion. Generally, the Nyquist criterion are an expedient well known to those skilled in the art and will not be discussed in detail. A transmit filter that meets the Nyquist criterion will have rolloff regions which when added together will provide a flat response.

Figure 14:
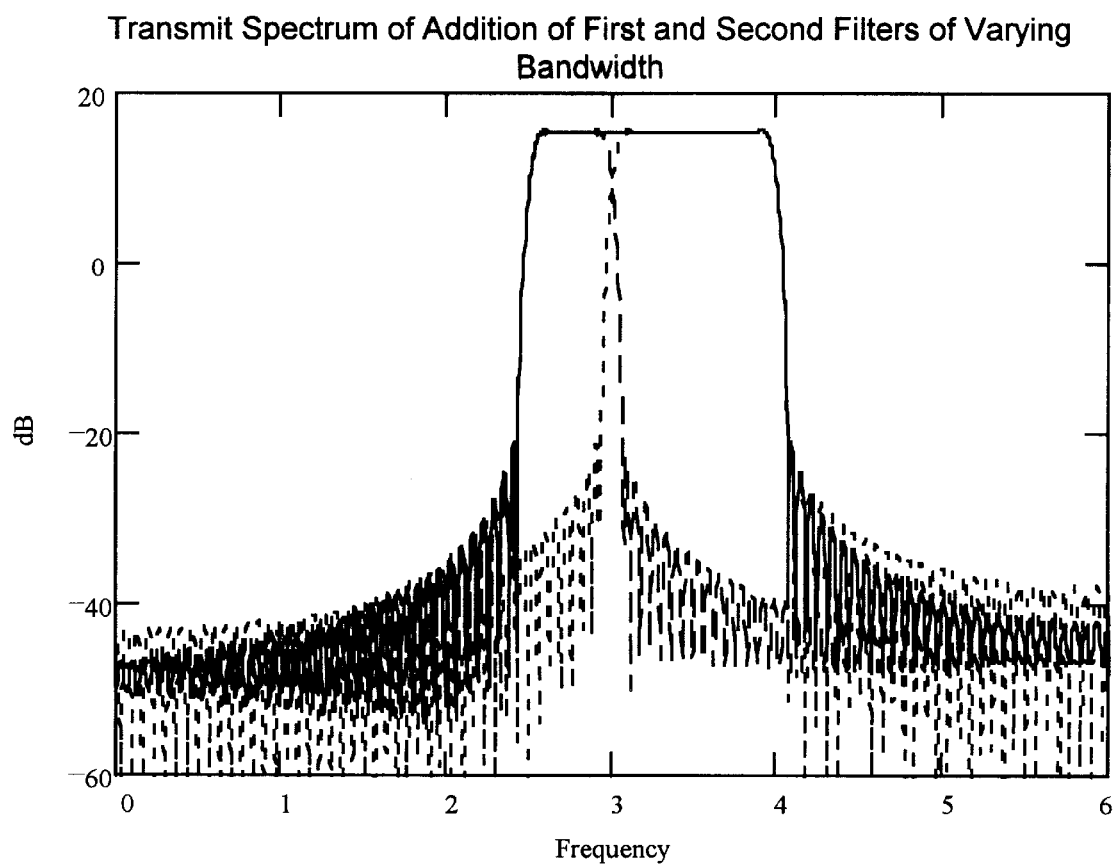
FIG. 14 is a frequency plot of the transmit spectrum of the third embodiment of the present invention.

Turning to FIG. 14, shown is a third embodiment of the present invention. In the third embodiment that is similar to the second, one may add a first filter 157 and a second filter 159 with different bandwidths where the difference between the center frequencies is equal to half the sum of the bandwidths. If the excess bandwidth of each of the two filters 157 and 159 is adjusted to have the same rolloff rate, one may also add the coefficients as in the second embodiment to achieve an expanded bandwidth. Note for example, if a first filter is half the bandwidth of the second filter, the first filter will need twice the excess bandwidth to achieve a flat response.

Note that in the case of the second and third embodiments, the resulting coefficients of the in-phase and quadrature filters calculated by combining two separate filters as shown will be equal to those calculated according to the preferred embodiment.

In a fourth embodiment, one may create the transmit filters of the second or third embodiments, except the two inband regions need not touch. This embodiment would be useful if there was interference between two good regions of the receive signal.

Figure 15:
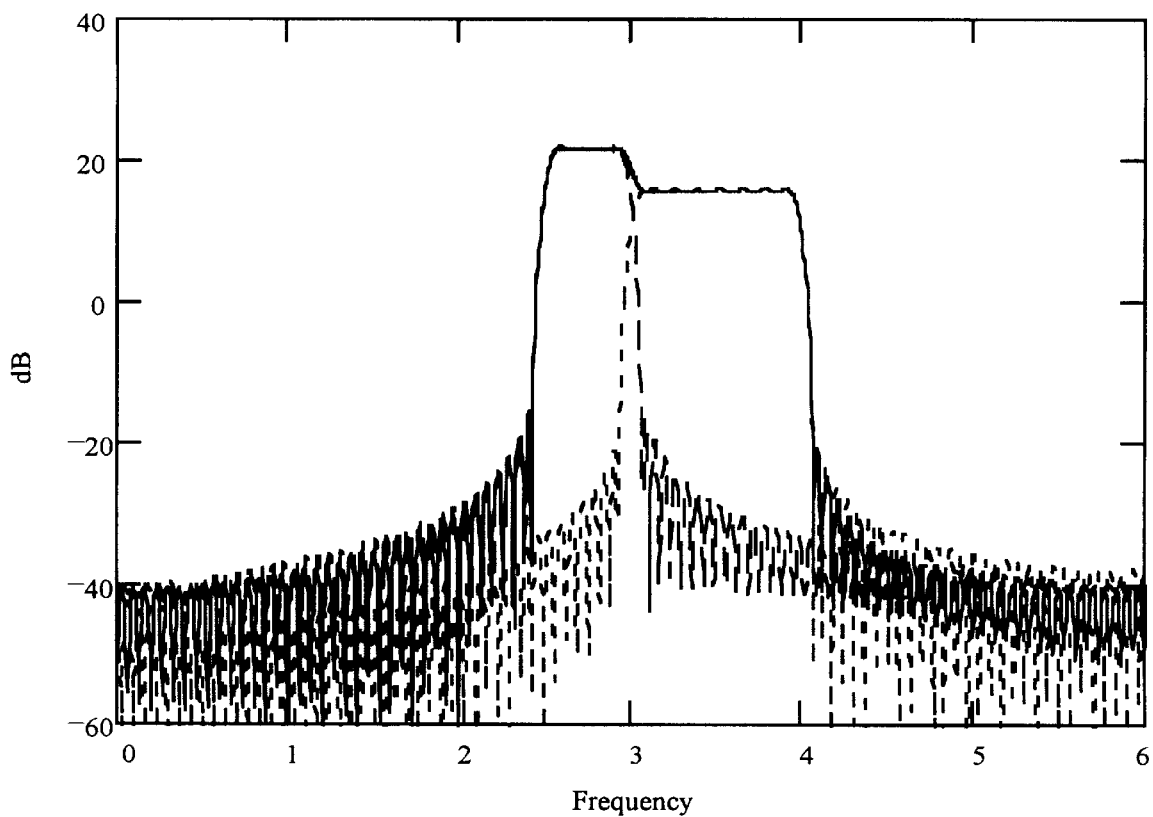
FIG. 15 is a frequency plot of the transmit spectrum of an alternative embodiment of the present invention.

Turning to FIG. 15, with regard to the second, third and fourth embodiments, there is no reason why one or more of the added filters could have their magnitudes adjusted as shown, thus allowing a transmit spectrum of variable magnitude. Also, there is no restriction to merely two bands. The resulting transmit filter may comprise the addition of coefficients from several different bands. The foregoing embodiments show some, but not all possible methods of expanding the bandwidth of a transmit spectrum.

Note that while the preferred embodiment features use of bandwidth expansion with quadrature amplitude modulation, it is understood that other embodiments include the use of the present invention with pulse amplitude modulation. In particular, pulse amplitude modulation features a single digital filter to process an in-phase signal alone. Thus, the bandwidth expansion concepts discussed herein generally apply to the processing of a single in-phase signal with the exception that the pulse amplitude modulation signal is not modulated to a carrier frequency, but is centered at DC in the frequency spectrum. Specifically, one may calculate the coefficients for such a filter with a symbol period that is less than the actual symbol period of the data signal with pulse amplitude modulation as was the case with the quadrature amplitude modulation of the preferred embodiment.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A modem, comprising:

an encoder to generate a discrete in-phase signal and a discrete quadrature signal from a data signal input;

an in-phase shaping filter processing the in-phase signal, said in-phase shaping filter configured to produce an in-phase signal with an expanded bandwidth, said in-phase shaping filter having a plurality of coefficients calculated from a first impulse response function with zero crossings at multiples of a predetermined symbol period, said predetermined symbol period being less than an actual symbol period of said discrete in-phase signal; and a quadrature shaping filter processing the discrete quadrature signal, said quadrature shaping filter configured to produce a quadrature signal with an expanded bandwidth, said quadrature shaping filter having a plurality of coefficients calculated from a second impulse response function orthogonal to said first impulse response function with zero crossings at multiples of the predetermined symbol period, said predetermined symbol period being less than an actual symbol period of said discrete quadrature signal.

2. The modem of claim 1, further comprising a mechanism to spread the bandwidth of said discrete in-phase and discrete quadrature signals by injecting a predetermined number of zero samples between the in-phase and quadrature signal symbols.

3. The modem of claim 2, wherein said first impulse response is defined as $f(t)=g(t) \cos 2\pi f_c t$ and said second impulse response is defined as $f(t)=g(t) \sin 2\pi f_c t$, where g(t) is defined as the square-root raised cosine function $$g(t) = \frac{\sin[\pi(1-\alpha)t'] + 4\alpha t' \cos[\pi(1+\alpha)t']}{\pi t'[1-(4\alpha t')^2]}$$

where t'=t/T, t is time, T is the symbol period, $f_c$ is the center frequency of the expanded bandwidth, and $\alpha$ is the excess bandwidth.

4. The modem of claim 2, wherein said first impulse response is defined as $f(t)=g(t) \cos 2\pi f_c t$ and said second impulse response is defined as $f(t)=g(t) \sin 2 \pi f_c t$, where g(t) is defined as the raised cosine function $$g(t) = \left(\frac{\sin(\pi t/T)}{\pi t/T}\right)\left(\frac{\cos(\alpha \pi t/T)}{1-(2\alpha t/T)^2}\right)$$

where t is time, T is the symbol period, $f_c$ is the center frequency of the expanded bandwidth, and α is the excess bandwidth.

5. A modem, comprising:
   means for generating a discrete in-phase signal and a discrete quadrature signal from a data signal input;
   a first means for filtering the discrete in-phase signal to produce an in-phase signal with an expanded bandwidth, said first means having a plurality of coefficients calculated from a first impulse response function with zero crossings at multiples of a predetermined symbol period, said predetermined symbol period being less than an actual symbol period of said discrete in-phase signal; and
   a second means for filtering the discrete quadrature signal to produce a quadrature signal with an expanded bandwidth, said second means signal having a plurality of coefficients calculated from a second impulse response function orthogonal to said first impulse response function with zero crossings at multiples of the predetermined symbol period, said predetermined symbol period being less than an actual symbol period of said discrete quadrature signal.

6. The modem of claim 5, further comprising a means for spreading the bandwidth of said discrete in-phase and discrete quadrature signals by injecting a predetermined number of zero samples between the in-phase and quadrature signal symbols.

7. The modem of claim 6, wherein said first impulse response is defined as $f(t)=g(t) \cos 2 \pi f_c t$ and said second impulse response is defined as $f(t)=g(t) \sin 2 \pi f_c t$, where g(t) is defined as the square-root raised cosine function $$g(t) = \frac{\sin[\pi(1-\alpha)t'] + 4\alpha t' \cos[\pi(1+\alpha)t']}{\pi t'[1-(4\alpha t')^2]}$$

where t'=t/T, t is time, T is the symbol period, $f_c$ is the center frequency of the expanded bandwidth, and α is the excess bandwidth.

8. The modem of claim 6, wherein said first impulse response is defined as $f(t)=g(t) \cos 2 \pi f_c t$ and said second impulse response is defined as $f(t)=g(t) \sin 2 \pi f_c t$, where g(t) is defined as the raised cosine function $$g(t) = \left(\frac{\sin(\pi t/T)}{\pi t/T}\right)\left(\frac{\cos(\alpha \pi t/T)}{1-(2\alpha t/T)^2}\right)$$

where t is time, T is the symbol period, $f_c$ is the center frequency of the expanded bandwidth, and α is the excess bandwidth.

9. A modem, comprising:
   a data signal input adapted to receive a data signal having a symbol period;
   an encoder adapted to generate a discrete in-phase signal and a discrete quadrature signal from the data signal;
   an in-phase filter adapted to process the discrete in-phase signal;
   a quadrature filter adapted to process the discrete quadrature signal; and
   a signal output adapted to transmit an output signal, the output signal being comprised of the addition of the processed discrete in-phase and discrete quadrature signals, the output signal having an expanded bandwidth with at least one expanded end that can be added coherently to a nominal bandwidth of the output signal.

10. The modem of claim 9, wherein the in-phase and quadrature filters are finite impulse response filters in which a value less than the symbol period is used to calculate an impulse response of the in-phase and quadrature filters.

11. The modem of claim 10, wherein the in-phase and quadrature filters further comprise an upsampling process.

12. The modem of claim 11, wherein the impulse response of the in-phase and quadrature filters is a raised cosine.

13. The modem of claim 11, wherein the impulse response of the in-phase filter is defined as $f(t)=g(t) \cos 2 \pi f_c t$ and the impulse response of the quadrature filter is defined as $f(t)=g(t) \sin 2 \pi f_c t$, where g(t) is defined as the raised cosine function $$g(t) = \left(\frac{\sin(\pi t/T)}{\pi t/T}\right)\left(\frac{\cos(\alpha \pi t/T)}{1-(2\alpha t/T)^2}\right)$$

where t is time, T is the symbol period, $f_c$ is the center frequency of the expanded bandwidth, and α is the excess bandwidth.

14. A modem, comprising:
    means for receiving a data signal having a symbol period;
    means for generating a discrete in-phase signal and a discrete quadrature signal from the data signal;
    a first filtering means for processing the discrete in-phase signal;
    a second filtering means for processing the discrete quadrature signal; and
    means for transmitting an output signal, the output signal being comprised of the addition of the processed discrete in-phase and discrete quadrature signals, the output signal having an expanded bandwidth with at least one expanded end that can be added coherently to a nominal bandwidth of the output signal.

15. The modem of claim 14, wherein the first and second filtering means are further comprise finite impulse response filters, each finite impulse response filter having an impulse response calculated using a predetermined symbol period that is less than the actual symbol period of the input signal.

16. The modem of claim 15, wherein the first and second filtering means further comprise an upsampling process.

17. The modem of claim 16, wherein the impulse response of the finite impulse response filters is a raised cosine.

18. The modem of claim 17, wherein the impulse response of the first filtering means is defined as $f(t)=g(t) \cos 2 \pi f_c t$ and the impulse response of the second filtering means is defined as $f(t)=g(t) \sin 2 \pi f_c t$, where g(t) is defined as the raised cosine function $$g(t) = \left(\frac{\sin(\pi t/T)}{\pi t/T}\right)\left(\frac{\cos(\alpha \pi t/T)}{1-(2\alpha t/T)^2}\right)$$

where t is time, T is the symbol period, $f_c$ is the center frequency of the expanded bandwidth, and α is the excess bandwidth.

19. A method for generating a modulated data signal output, comprising the steps of:
    generating a discrete in-phase signal and a discrete quadrature signal from a data signal input;

expanding the bandwidth of the in-phase signal with an in-phase digital filter;

expanding the bandwidth of the quadrature signal with a quadrature digital filter;

adding the expanded discrete in-phase and quadrature signals, thereby generating a digital output signal having an expanded bandwidth with at least one expanded end that can be added coherently to a nominal bandwidth of the digital output signal; and converting the digital output signal to an analog output signal capable of being transmitted across a channel.

20. The mwthod of claim 19, wherein the step of expanding the bandwidth of the quadrature signal with a quadrature digital filter comprises the step of filtering the discrete in-phase signal using a plurality of coefficients calculated from a first impulse response function using a predetermined symbol period that is less than the actual symbol period of the discrete in-phase and quadrature signals.

21. The method of claim 20, wherein the step of expanding the bandwidth of the quadrature signal with a quadrature digital filter further comprises the step of filtering the discrete quadrature signal using a plurality of coefficients calculated from a second impulse response function orthogonal to said first impulse response function, the coefficients being calculated using a predetermined symbol period that is less than the actual symbol period of the discrete in-phase and quadrature signals.

22. The method of claim 21, further comprising the step of upsampling the discrete in-phase and quadrature signal symbols, thereby spreading the bandwidth of the discrete in-phase and quadrature signals.

* * * * *